(12) United States Patent
Poplack et al.

(10) Patent No.: US 11,275,598 B1
(45) Date of Patent: Mar. 15, 2022

(54) DYNAMIC ONE-BIT MULTIPLEXING SWITCH FOR EMULATION INTERCONNECT

(71) Applicant: CADENCE DESIGN SYSTEMS, INC., San Jose, CA (US)

(72) Inventors: Mitchell G. Poplack, San Jose, CA (US); Yuhei Hayashi, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 746 days.

(21) Appl. No.: 16/208,447

(22) Filed: Dec. 3, 2018

(51) Int. Cl.
*G06F 9/455* (2018.01)
*H04L 49/101* (2022.01)
*H04L 45/00* (2022.01)
*G06F 13/10* (2006.01)
*G06F 13/38* (2006.01)

(52) U.S. Cl.
CPC ........ *G06F 9/45504* (2013.01); *G06F 13/105* (2013.01); *H04L 45/04* (2013.01); *H04L 49/101* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 5,008,878 A | * | 4/1991 | Ahmadi | H04L 49/25 370/353 |
| 5,703,875 A | * | 12/1997 | Burnett | H04L 49/254 370/381 |
| 7,562,320 B2 | * | 7/2009 | Guenther | G06F 30/30 716/106 |

* cited by examiner

*Primary Examiner* — Craig C Dorais
(74) *Attorney, Agent, or Firm* — Foley & Lardner LLP (57) ABSTRACT

The embodiments disclosed herein describe a switching ASIC that provides a dynamic single-bit routing and multiplexing function in an emulation system. The switching ASIC may receive a set of incoming data streams from a first set of emulation devices (e.g., emulation ASICs), disassemble each data stream to the constituent bits, dynamically multiplex the bits, reassemble the multiplexed bits into outgoing data streams, and transmit the outgoing data streams to a second set of emulation devices. Multiple statically scheduled selection tables (UCSWs), one for each output lane of the switching ASIC, drive the selection and routing of bits from input slots of various input lanes to the output slots of the output lane.

20 Claims, 7 Drawing Sheets

DYNAMIC ONE-BIT MULTIPLEXING SWITCH FOR EMULATION INTERCONNECT

TECHNICAL FIELD

This application is generally directed towards switches in an emulation system and specifically towards dynamic one-bit (or single-bit) multiplexing switches between components of the emulation system.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based electronic design automation (EDA) tools for synthesis, debugging, and functional verification of the ICs. EDA tools can emulate of a user's logical system (e.g., an IC design) to perform pre-silicon functional verification, firmware and software development, and post-silicon debug. To achieve this, a typical processor-based emulation system comprises several application specific integrated circuits (ASICs), often referred to as emulation ASICs, all working together to execute a program generated by an emulation compiler generated from the user's IC design. The compiled program models a design under test (DUT) that is a logical representation of the user's IC design running on the several emulation ASICs of the emulation system.

The emulation ASICs may be organized at various levels of hierarchy. For example, a logic board may contain several ASICs. Several logic boards may form a cluster, and several clusters may form a server rack. Furthermore, a cluster may encompass several drawers within the server rack. In addition to running own instructions, each emulation ASIC may communicate with other emulation ASICs in other logic boards, in other drawers, in other clusters, and/or other server racks. As different ASICs are modelling/running different interconnected portions of the DUT, the transmission of data between different ASICs is an important function within the emulation system.

Conventional emulation systems have fixed interconnects between their components. The fixed interconnects are inefficient because some components may require multiple hops to communicate with each other whereas other components may have unnecessary fat connections between them. For example, in a conventional emulation system, due to backplane limitations, each emulation ASIC within in a logic board within a cluster is connected to only half of the emulation ASICs in the other logic boards of the cluster. A communication between the unconnected emulation ASICs therefore requires extra hops through the connected emulation ASICs. Another conventional emulation system may have a cable connecting an emulation ASIC 1(i) of a first logic board to an emulation ASIC 2(i) of a second logic board. The cable therefore may form a dedicated fat connection between the ASICs 1(i) and 2(i) and using this connection may usually require funneling signals from other ASICs, resulting in extra hops.

Therefore, conventional emulation systems offering fixed connections may require unnecessary hops from a source ASIC to a destination ASIC and may provide seldom-used dedicated connections in other cases. Furthermore, conventional interconnect systems may be based upon packet switching and may not provide the functionality of single-bit switching. As such, a significant improvement in the interconnectivity of various components of emulation is required.

SUMMARY

What is therefore desired are emulation systems that provide dynamic single-bit multiplexing and switching in interconnects between various components (e.g., emulation devices such as emulation ASICs) of the emulation system. In an attempt to solve the aforementioned technical problems, the embodiments disclosed herein describe a switching ASIC that provides a dynamic single-bit routing and multiplexing function in an emulation system. The switching ASIC may receive a set of incoming data streams from a first set of emulation devices (e.g., emulation ASICs), disassemble each data stream to the constituent bits, dynamically multiplex the bits, reassemble the multiplexed bits into outgoing data streams, and transmit the outgoing data streams to a second set of emulation devices. Multiple statically scheduled selection tables (also referred to as UMUX control store words (UCSWs)), one for each output lane of the switching ASIC, drive the selection and routing of bits from input slots (UBIs) of various input lanes to the output slots (UBOs) of the output lane.

In one embodiment, a logic emulator comprises a first portion of an emulation circuit; a first set of lanes in electrical communication with the first portion of the emulation circuit; a second portion of the emulation circuit; a second set of lanes in electrical communication with the second portion of the emulation circuit; and a switch electrically connected to the first set of lanes and the second set of lanes, the switch configured to dynamically route a single bit from any lane of the first set of lanes to any lane of the second set of lanes to allow the single bit to be transmitted from the first portion to the second portion.

In another embodiment, an emulation method comprises receiving, by a switch of a logic emulator, input data streams from a first set of lanes electrically connected to a first portion of an emulation circuit in the logic emulator; and dynamically routing, by the switch, a single bit from a data stream from any lane of the first set of lanes to any lane of a second set of lanes electrically connected to a second portion of the emulation circuit to allow the single bit to be transmitted from the first portion to the second portion.

BRIEF DESCRIPTION OF THE DRAWINGS

The accompanying drawings constitute a part of this specification and illustrate an embodiment of the subject matter described herein.

DETAILED DESCRIPTION

Embodiments disclosed herein describe a switching ASIC in an emulation system that enables dynamic single-bit routing and multiplexing between components of the emulation system. The switching ASIC may receive serial streams of data from a first set of emulation devices (e.g., emulation ASICs), decode the serial streams of data into bits, dynamically multiplex the bits, re-encode the multiplexed bits into serial streams of output data, and transmit the output data to a second set of emulation devices. For the dynamic multiplexing, the switching ASIC may comprise a switch matrix (UMUX) controlled by statically scheduled selection tables (UCSWs) that may determine routes for bits from input slots (UBIs) to the output slots (UBOs) of the switching ASIC.

An UCSW for each lane in the ASIC may be driven by a corresponding sequencer associated with. The sequencer may provide a stepping input to the UCSW such that the UCSW provides control words stored therein to a respective chunk of the UMUX. The control words provide the selector signals for the multiplexers in the respective chunk of the UMUX. The combination of control words from the respective UCSWs (also referred to as slices of the UCSWs of the UMUX) to the respective UMUX chunks thereby provide a dynamic routing of bits from UBIs to UBOs. It should be understood that the routing is not performed through fixed connections in the UMUX but rather controlled by the UCSWs to provide reconfigurable path for each and every bit that may pass through the switching ASIC.

The switching ASIC may further include input buffers to transmit time aligned data to the UMUX. For example, the input buffers may temporarily store incoming data for an emulation job until all the data for all lanes of the emulation job start to arrive at the input lanes. After all of the data is received at the input lanes, the input buffers may provide time aligned data to the UMUX for single-bit routing and multiplexing. Furthermore, the switching may include one or more output buffers to maintain data bursts. For example, the switching ASIC may temporarily store routed output bits in the output buffer until there is an availability of UBOs being used by a previous data burst.

Figure 1:
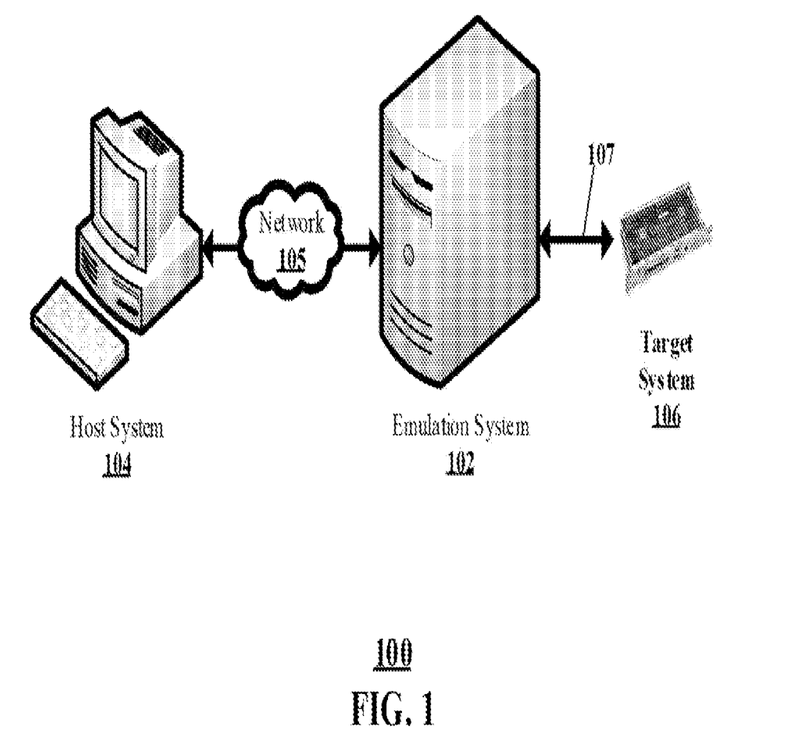
FIG. 1 shows an illustrative environment including an emulation system, according to an embodiment.

FIG. 1 shows an illustrative environment 100 of an emulation system including switching ASICs for dynamic single-bit routing or multiplexing, according to an embodiment. The illustrative environment 100 may comprise a host system 104, an emulation system 102, a target system 106, a network 105, and a connection 107. The host system 104 may include one or more workstations that may run debug and runtime software interacting with the emulation system 102. The workstations may be any type of computing devices such as a desktop computers, laptop computers, tablet computers, and smartphones. The emulation system 102 may a combination of hardware and software modules which may emulate a design under test (DUT). As described below, the emulation system 102 may include clusters of interconnected ASICs, non-transitory memory devices, buffers, data storage devices configured to provide a system platform for emulating the DUT. The clusters may be arranged in multiple boards. The boards may be arranged within multiple racks. Multiple racks may be arranged in a plurality of emulation of devices, which may be analogous to multi-rack servers. The target system 106 may comprise hardware and/or software modules configured to interact with the DUT being emulated. For example, if the DUT is a design of a graphics processing unit (GPU), the target system 106 may be a motherboard configured to receive the GPU after fabrication. In other words, the target system 106 may be an external hardware environment provided by the user.

The network 105 may be any kind of communication link facilitating communication between the host system 104 and the emulation system 102. For example, the network 105 may a local area network may include a local area network (LAN), metropolitan area network (MAN), wide area network (WAN), and/or the Internet. The connection 107 may be also be any kind of communication link configured to facilitate a communication with the emulation system 102 and the target system 106.

It should be understood that the above described systems 102, 104, 106 of the environment 100 are merely illustrative and other configuration should be considered to be within the scope of this disclosure. For example, the network 105 may include a local connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 104 using a remote access protocol such as internet protocol (IP).

Figure 2:
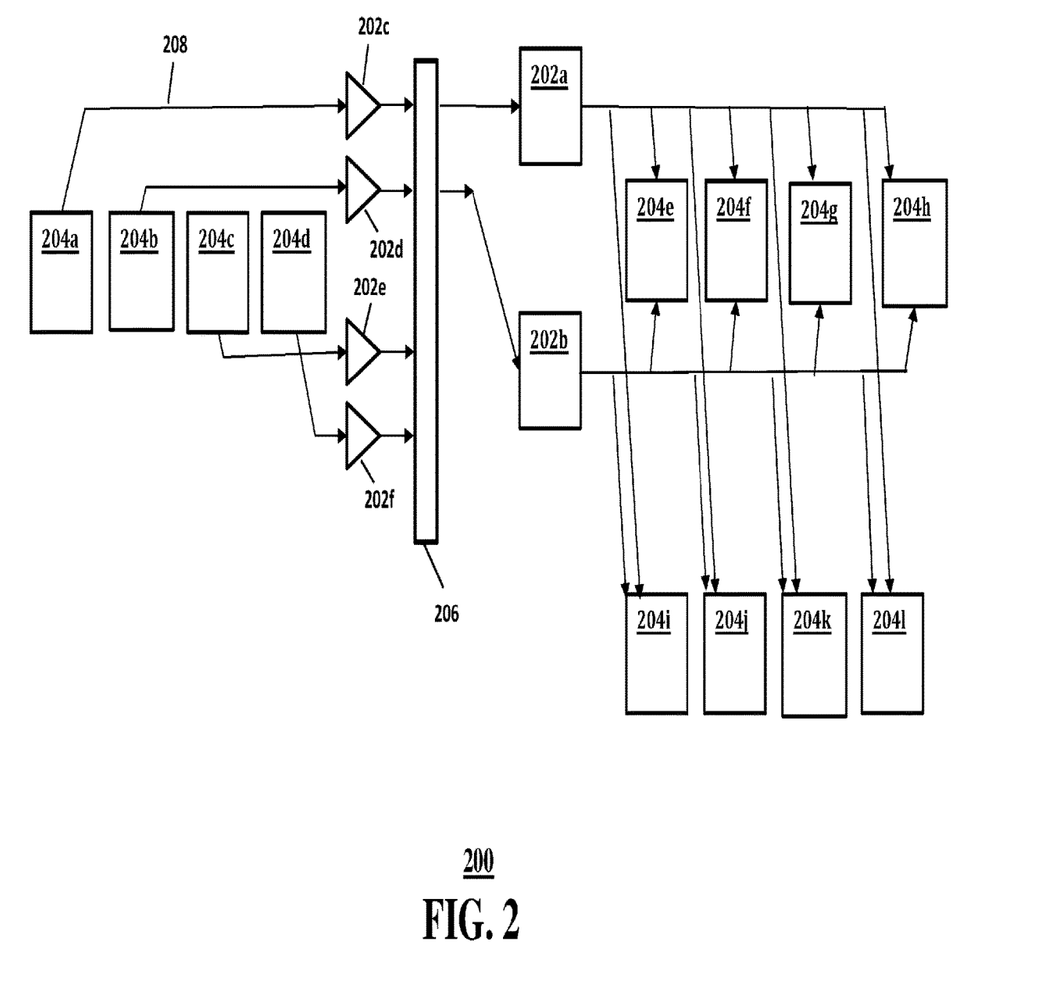
FIG. 2 shows an illustrative emulation circuit containing emulation ASICs and switching ASICs, according to an embodiment.

FIG. 2 shows an illustrative emulation circuit 200 in an emulation system (e.g., emulation system 102 shown in FIG. 1). As shown, the emulation circuit 200 may include a plurality of emulation ASICs 204a-204l (collectively or commonly referred to as 204), a plurality of switching ASICs 202a-202f (collectively or commonly referred to as 202), and a backplane 206. The components of the emulation circuit 200 may be connected to each other using a plurality of interconnects (an interconnect 208 has been labeled for reference).

The emulation ASICs 204 may emulate or model various portion of a DUT during the runtime of the emulation system. Furthermore, the emulation ASICs 204 may have to communicate with each other during the runtime of the emulation system. The switching ASICs 202 may facilitate the communication between the emulation ASICs 204 by providing dynamic single-bit routing and multiplexing in the connections between the emulation ASICs 204.

For example, a first set of emulation ASICs 204a-204b may have to transmit data to a second set of emulation ASICs 204e-204l during an emulation cycle through the corresponding interconnects. A first set of switching ASICs 202c-202d may operate in a pass-through mode by providing the data coming from the first set of emulation ASICs 204a-204b to the backplane 206. A second set of switching ASICs 202a-202b may receive the data from the first set of emulation ASICs 204a, perform dynamic single-bit routing and multiplexing of the data and transmit the routed data to the second set of emulation ASICs 204e-204i.

Figure 3A:
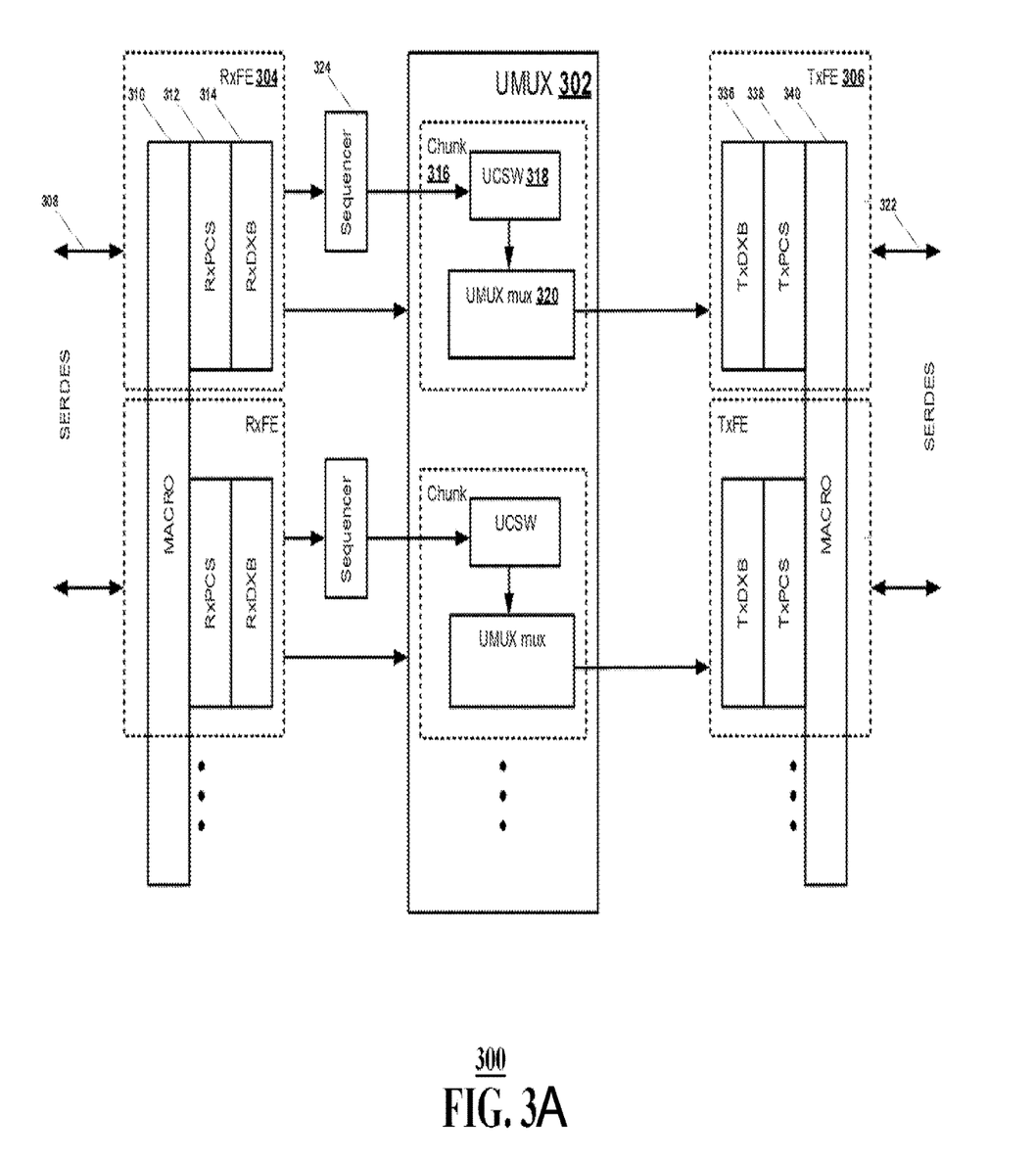
FIG. 3A shows illustrative components of a switching ASIC, according to an embodiment.

FIG. 3 shows an architecture of an illustrative switching ASIC 300 in an emulation system, according to an embodiment. It should be understood that the architecture and the components are merely illustrative and other architectures and components should be considered within the scope of this disclosure. As shown, the switching ASIC 300 may comprise a plurality of receiver front end (RxFE) circuit blocks (e.g., RxFE circuit block 304), an UMUX 302, and a plurality of transmitter front end (TxFE) circuit blocks (e.g., TxFE circuit block 306). It should be understood that although a single RxFE circuit block 304, a single UMUX chunk 316 of the UMUX 302, and a single TxFE circuit block 306 have been described herein, the respective descriptions should apply to the other RxFE circuit blocks, other UMUX 302 slices, and the other TxFE circuit blocks.

The RxFE circuit block 304 may receive incoming data from a corresponding data input lane 308. In other words, within the emulation ASIC 300, the RxFE circuit block 304 may be assigned to the data input lane 308. The RxFE circuit block 304 may include a serializer-deserializer (SERDES) macro receiver 310 that may receive incoming serial data (e.g., high speed serial data) from the data input lane 308, deserialize the received data to generate parallel data, and provide the parallel data to a receiver physical coding sublayer (RxPCS) 312. In addition to the parallel data, the macro receiver 310 may provide to the RxPCS 312, a receiver clock (rx_clk) signal. In some embodiments, the macro receiver 310 may be shared by the RxFE circuit block 304 with other RxFE circuit blocks in the ASIC 300. The RxPCS 312 may decode the data received from the macro receiver 310 to reverse physical channel coding. A dual port receiver domain crossing buffer (RxDXB) 314 may receive the decoded data from the RxPCS 312 in the rx_clk domain and provide the data to the core of the switching ASIC 300 (e.g., UMUX 302) in the clock domain of the core (e.g., step clock (stepclk) domain). Furthermore, the RxDXB 314 may include configurable rate matching logic that may repeat an intermittent patterns of reads in the stepclk domain to match the rate of data provided in the rx_clk domain. The RxDXB 314 may also provide checking, correction, and/or debugging functionality to allow optimization of the delay path across an interface of the switching ASIC 300 connected to the data input lane 308. The RxDXB 314 may further provide a flag related to a prefix word to indicate the beginning of the data for an emulation cycle.

The switching ASIC 300 may comprise a sequencer for each output lane. An illustrative sequencer 324 for the data output lane 322 is described herein. The sequencer 324 may generate a sequence of addresses (stepnum) for each emulation cycle to be provided to the UCSW 318. The sequencer 324 may align source lanes (including data input lane 308 and other data lanes) corresponding to the data output lane 322 for an emulation job in an emulation cycle such that the UMUX 302 may select data as configured by the scheduler for the emulation cycle. The sequencer 324 may be triggered by a clock domain-crossing micro-architecture (not shown) with a configurable logic such that the UMUX 302 receives bits from the subset of the receiver lanes (which may include data input lane 308) corresponding to the data output lane 322 for the emulation job.

In an embodiment, the switching ASIC 300 may trigger a switching operation in the UMUX 302 when all the source lanes have received a prefix word associated with an emulation job. For example, each of the RxDXBs associated with the emulation job (which may include RxDXB 304) may store the received data until other RxDXBs receive the prefix word. All of the RxDXBs associated with the emulation may then provide the received data to the UMUX 302 in a time-aligned manner. As a result, the switching ASIC 300 may switch and multiplex time aligned data thereby providing a delay symmetry to the data passing through the switching ASIC 300.

In another embodiment, the switching logic may be configured for a partial subset triggering when it is desired to compile for performance rather than the aforementioned delay symmetry. For instance, some data for the same emulation job may arrive at the switching ASIC 300 earlier than other data. In this case, waiting for the other data, more particularly the prefix words for other source lanes may mean that the data from the earlier lanes may reside in the corresponding RxDXBs for longer than necessary thereby increasing the latency for the full path transmission.

To alleviate the aforementioned latency problem, the switching ASIC 300 may start the execution of the corresponding UCSW execution in the early lanes compared to the later lanes. Effectively then at beginning steps of the switching operation, the UMUX 302 may switch and multiplex data arriving at earlier input lanes. The UMUX 302 may then subsequently switch and multiplex data at the later input lanes at the later steps of the switching operation when the later input lanes have valid data. For this case, the switching ASIC 300 may utilize RxDXB validity checking mechanism to check whether the later lanes have valid data. The validity checking mechanism may always be active. If the prefix word for a later input lane does not arrive by the expected time as indicating by the validity checking mechanism, the switching ASIC 300 may generate an error.

The UMUX 302 may be divided into UMUX chunks including the UMUX chunk 316, which has been described in detail herein. The UMUX chunk 316 may include the UCSW 318 that may be a slice of the control store of the switching ASIC 300 and UMUX mux 320 that may be a slice of the switching matrix of the switching ASIC 300. The UMUX chunk 316 may receive parallel data from the RxDXB 314. The UCSW 318 may provide configuration words to the UMUX mux 320 to perform single-bit multiplexing and routing of the data received from RxDXB 314.

Figure 3B:
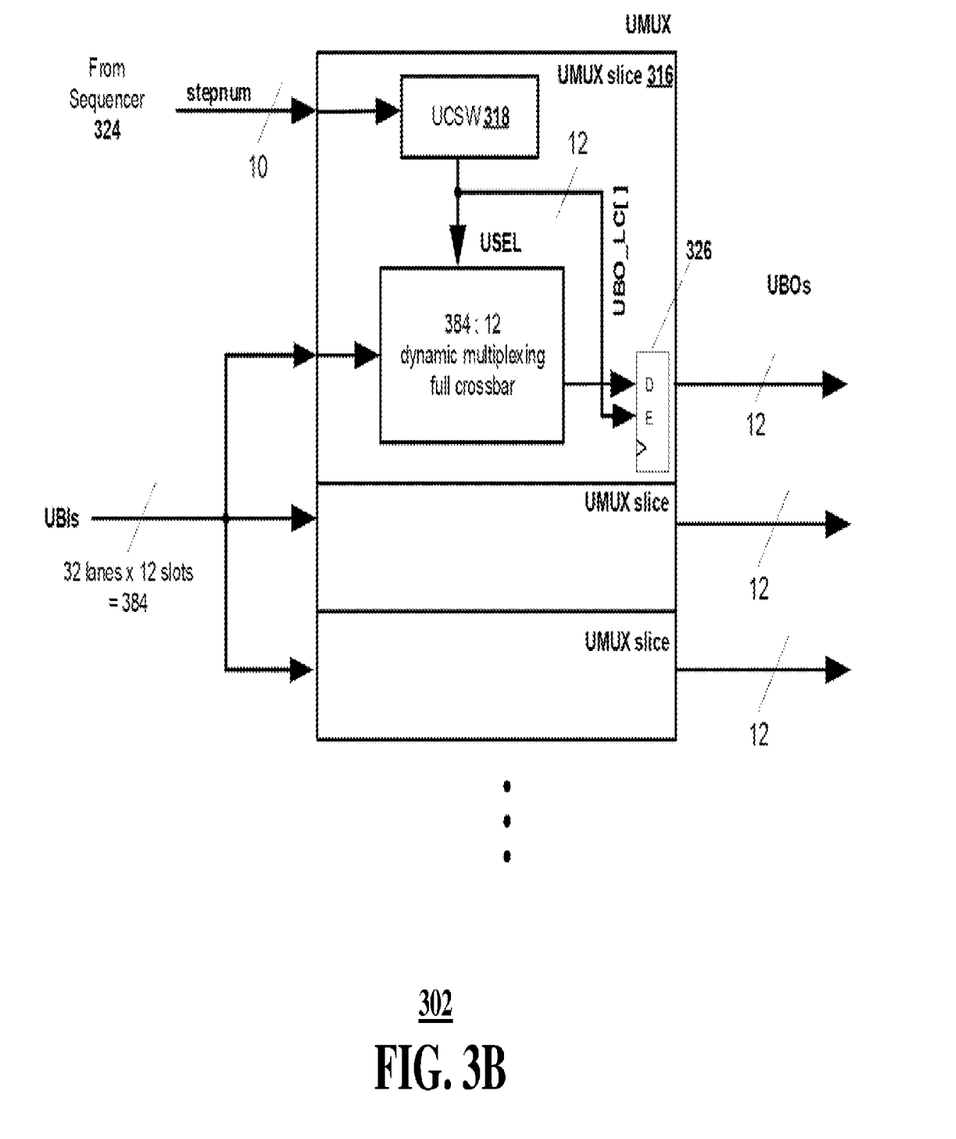
FIG. 3B shows an illustrative UMUX of a switching ASIC, according to an embodiment.

It should be understood that the emulation ASIC 300 may be configured to support a range of rates when there is a mismatch between the input throughputs at the UBIs and output throughputs at the UBOs. Therefore, the UMUX 302 may include an enablable hold flop (an output buffer) at the output of the UMUX 302. For example, FIG. 3B, shows a hold flop 326 that may receive an instruction bit associated with each output slot from the UCSW 318.

Returning to FIG. 3A, the transmitter front end (TxFE) circuit block 306 of the switching ASIC 300 contains a transmitter domain crossing buffer (TxDXB) 336 that may be any form of a memory device. The TxDXB 336 may store data from the clock domain (stepclk) of the core of the switching ASIC 300 (e.g., UMUX 302) and provide data to the transmitter clock domain (tx_clk). The TxDXB 336 may further contain a configurable rate matching logic which may repeat an intermittent pattern of writes in the stepclk domain to match of the rate of data provided to the tx_clk domain. The TxDCB 336 may further have checking, correction, and/or debugging functionality to allow the optimization of the delay path across that interface. A transmitter PCS encoder (TxPCS) may encode output data stream into a suitable physical channel coding. A SERDES macro transmitter 340 may provide a transmitter clock (tx_clk) signal, accept parallel data to be transmitted synchronous to tx_clk, convert the parallel data into serial data, and transmit the serial data to one or more destination devices. In some embodiments, a plurality of transmit circuit blocks (including TxFE circuit block 306) may share a single SERDES macro transmitter 340.

Figure 4:
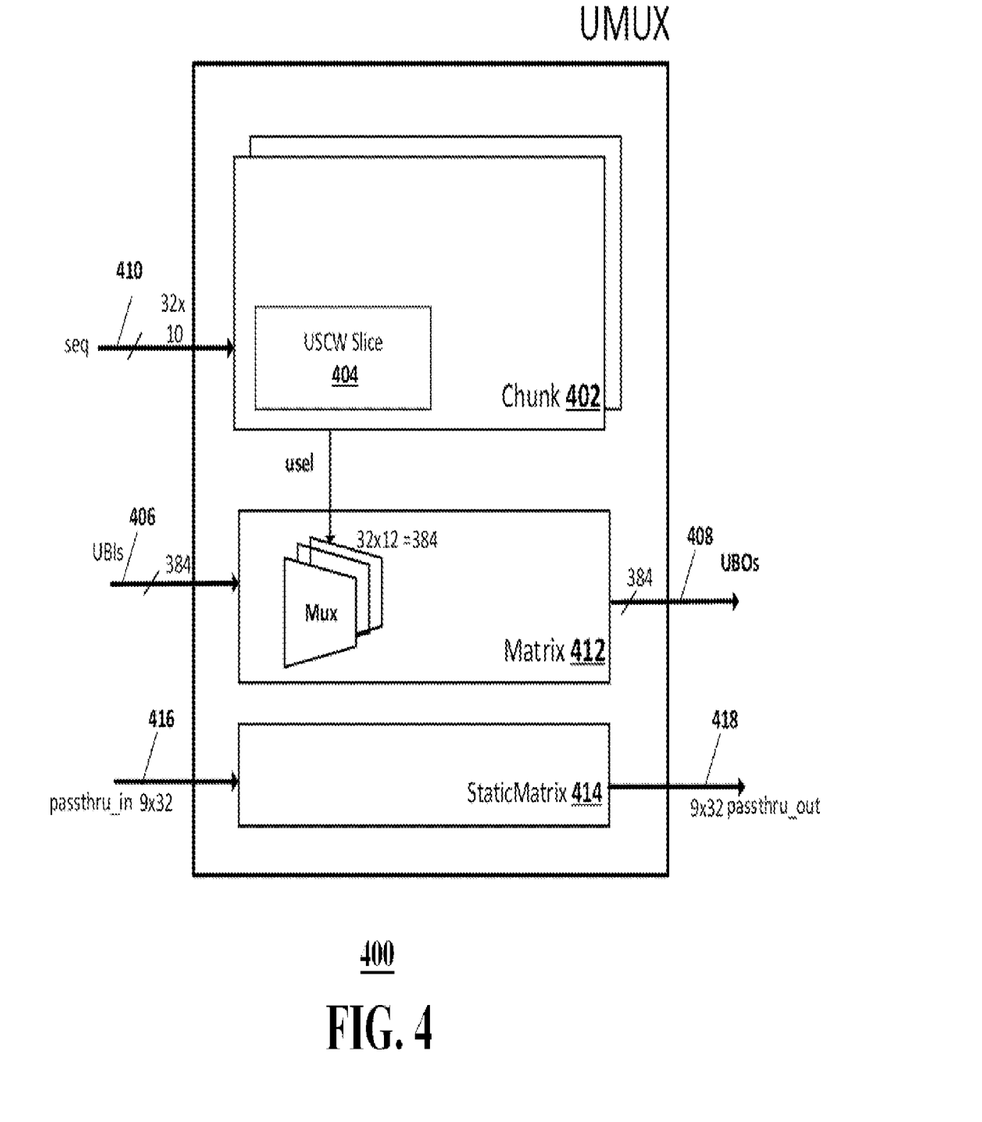
FIG. 4 shows an illustrative UMUX of a switching ASIC, according to an embodiment.

FIG. 4 shows an illustrative UMUX 400, according to an embodiment. The UMUX 400 may be a part of a core logic of a switching ASIC, an example of which is shown in FIG. 3A. The UMUX 400 may provide a full crossbar switch functionality between UBIs 406 and UBOs 408.

The UMUX 400 may be divided into UMUX chunks (e.g., UMUX chunk 402) based on the number of SERDES lanes supported by the switching ASIC. The illustrative UMUX 400 is divided into 32 UMUX chunks thereby supporting 32 SERDES lanes. Each UMUX chunk may be stepped independently during runtime by a stepping signal from a corresponding sequencer. For example, the UMUX chunk 402 may be driven by a stepping signal 410 generated from its corresponding sequencer (not shown). The UMUX chunk 402 may further comprise a UCSW slice 404 which may provide 12 usels to a switching matrix 412 which may include a plurality of multiplexers to realize the crossbar switch between the UBIs 406 and the UBOs 408.

As described above, there may be 384 UBIs for the UMUX 400, based on 12 slots for each of the 32 SERDES lanes (32*12=384). Each of the 32 UCSW slices may provide 12 usels (i.e., 32*12=384) to the switching matrix 412 to generate 384 UBOs overall. The UMUX 400 may further have a static matrix 414 that may implement a pass-through functionality that may allow additional overhead input data 416 to pass through the UMUX 400 as an output data 418 without decoding by the RxPCS such that the UMUX 400 (and the switching ASIC containing the UMUX 400) can be used as a static switch independent of PCS protocol.

Figure 5:
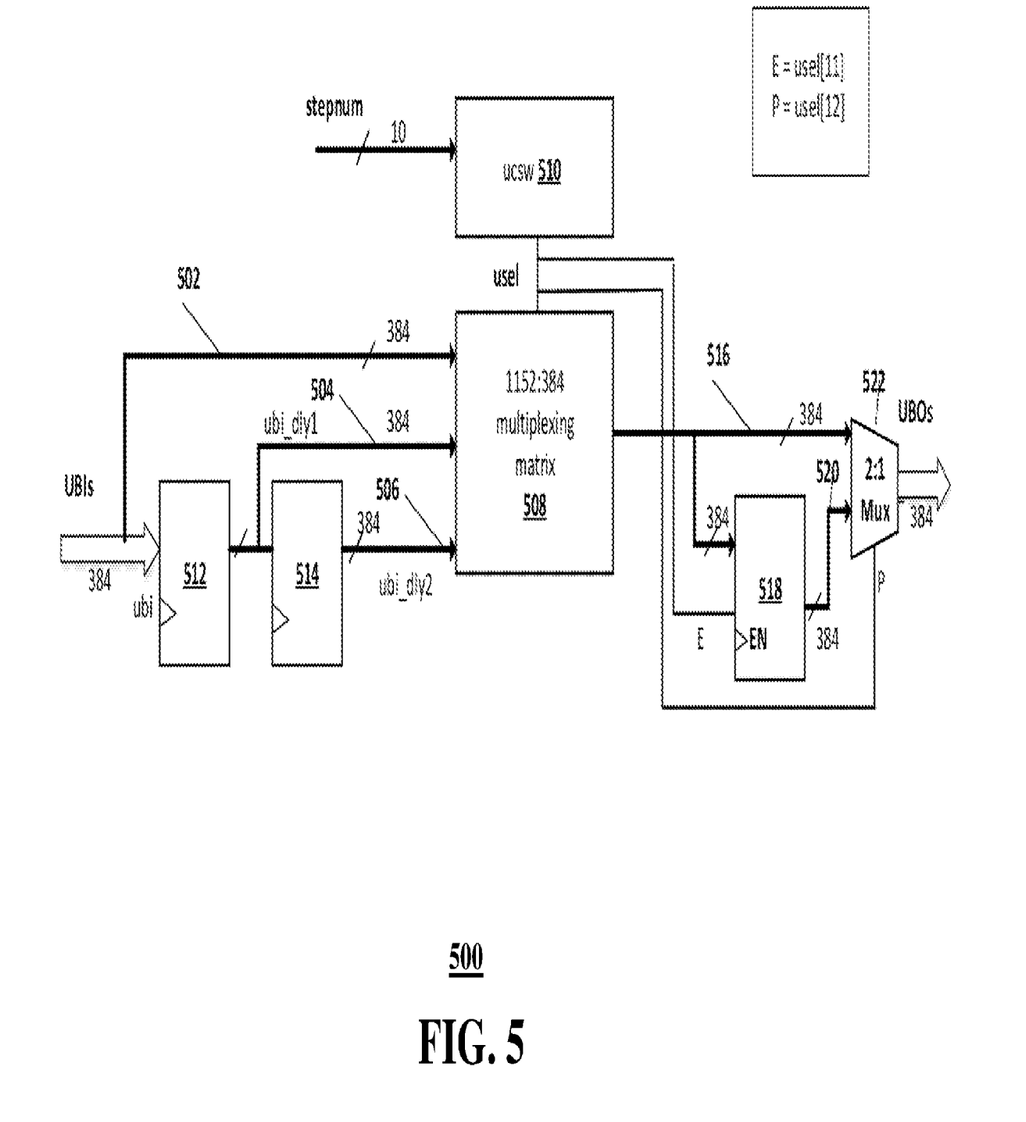
FIG. 5 shows an illustrative flow diagram of single-bit routing and multiplexing of delayed and non-delayed input data streams, according to an embodiment.

FIG. 5 shows a data flow diagram 500 through a switching ASIC enabling delayed UBIs. As seen in the flow diagram 500, the switching ASIC may support a full crossbar between UBIs 502, 1-cycle-delayed UBIs 504, and 2-cycles-delayed UBIs 506. As there are total number of 384 UBIs (based upon 32 SERDES lanes and 12 slots), the total number inputs to the multiplexing matrix 508 is 384 (not-delayed)+384 (1-cycle-delayed)+384 (2-cycles-delayed) =1152. A first register 512 may impart 1-cycle delay to the UBIs 502 to generate the 1-cycle delayed UBIs 504. A second register 514 may impart 1-cycle delay to the 1-cycle delayed UBIs 504, thereby generating 2-cycle delayed UBIs 506. The number of UBOs generated by the multiplexing matrix 508 does not change, remaining at 384 (i.e., 32 SERDES lanes*12 slots). An UCSW memory unit 512 may provide user select (usel) signals to drive the multiplexing matrix 508 and generate UBOs 516. The switching ASIC may delay the UBOs 516 by using a third register 518 to generate delayed UBOs 520. Based on an input bit in the usel signal, the multiplexer 522 may select between UBOs 516 and the delayed UBOs 520.

Figure 6:
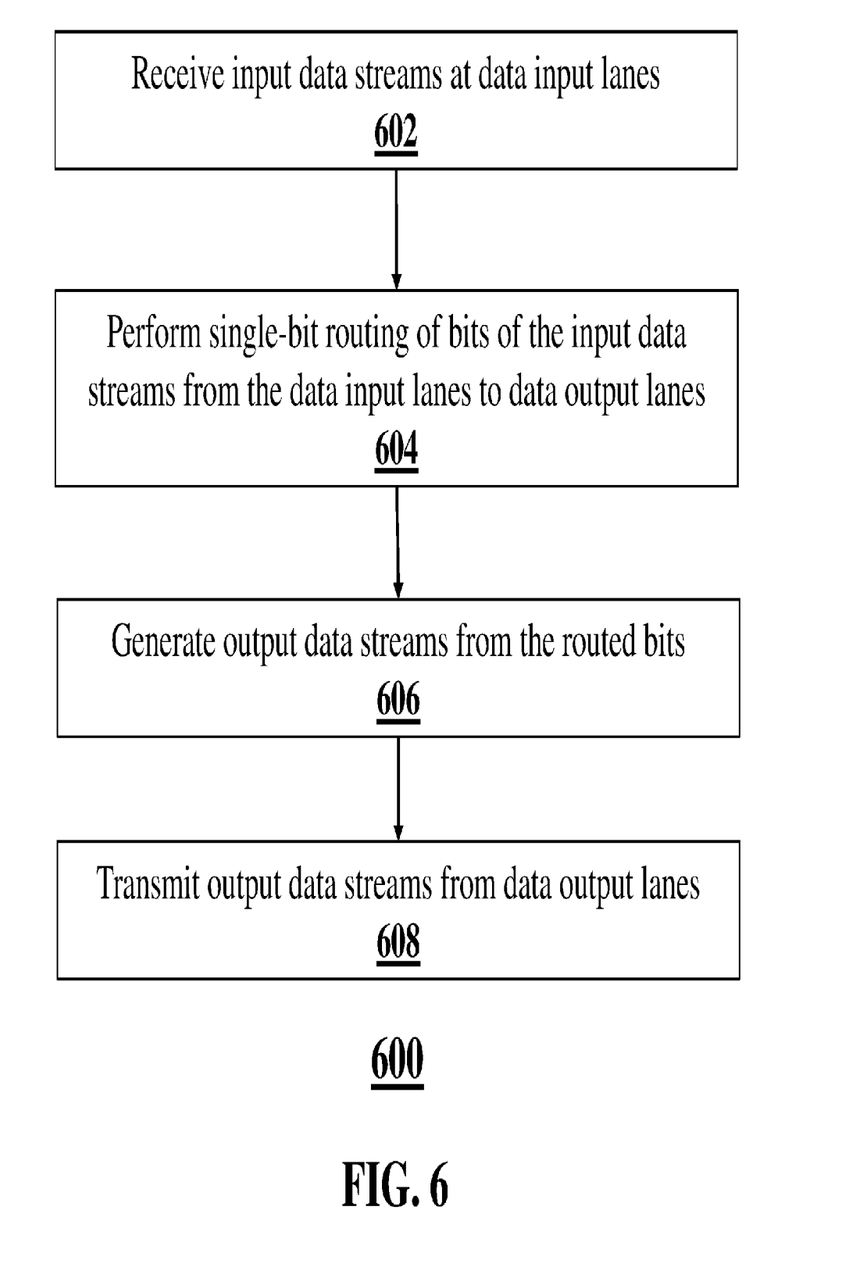
FIG. 6 shows an illustrative flow diagram of single-bit routing and multiplexing of data between various portions of an emulation circuit, according to an embodiment.

FIG. 6 shows a flow diagram of an illustrative method 600 of dynamic single-bit switching of data between portions of an emulation circuit of an emulation system. It should be understood that the steps described herein are merely illustrative and additional or substitute steps should also be considered to be within the scope of this disclosure. Furthermore, methods with a fewer numbers of steps should also be considered to be within the scope of this disclosure. Although various portions of an emulation ASIC may perform different steps of the method 600, the following description details the emulation ASIC performing the different steps of the method 600.

The method 600 may begin at step 602, wherein a switching ASIC of a logic emulator may receive input data streams at data input lanes. The data input lanes may be electrically connected to a first portion of an emulation circuit of a logic emulator.

At step 604, the switching ASIC may perform single-bit routing of bits of the input data streams from the data input lanes to data output lanes of switching ASIC. To perform the single-bit routing, the switching ASIC may deserialize the input data streams to provide parallel bits to a switching matrix in the emulation ASIC. The switching matrix may be driven by one or more control store words stored in a memory in the switching ASIC. A sequencer within the emulation ASIC may provide a stepping signal to the memory such that switching ASIC may step through one control word at each step. Based on the one or more control words, the switching ASIC may provide selector signals to the plurality of multiplexers the switching matrix to route the parallel single-bits to the data output lanes.

At step 606, the switching ASIC may generate output data streams from the bits routed by the switching matrix. For instance, the switching ASIC may generate output data packets (or words) by combining various routed bits.

At step 608, the switching ASIC may transmit output data streams from data output lanes. The data output lanes may be electrically connected to a second portion of the emulation circuit. In some embodiments, the switching ASIC may provide a hold buffer to temporarily store the routed bits prior to generating and transmitting the output data streams. The hold buffer may temporarily store the routed bits until output slots (e.g., UBO slots) are available for the routed bits. The hold buffer may therefore enable the emulation ASIC to operate in a burst mode, where the flow of the input data streams and the output data streams is not necessarily uniform but changes with time.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A logic emulator comprising:
a first portion of an emulation application specific integrated circuit;
a first set of lanes in electrical communication with the first portion of the emulation circuit;
a second portion of the emulation application specific integrated circuit;
a second set of lanes in electrical communication with the second portion of the emulation application specific integrated circuit; and
a switch electrically connected to the first set of lanes and the second set of lanes,
the switch configured to dynamically route according to one or more control words a single bit from any lane of the first set of lanes to any lane of the second set of lanes to allow the single bit to be transmitted from the first portion to the second portion.

2. The logic emulator of claim 1, wherein the switch is further configured to extract the single bit from an incoming data packet.

3. The logic emulator of claim 2, wherein the switch is further configured to append the single bit to an outgoing data packet different from the incoming data packet.

4. The logic emulator of claim 1, wherein the switch further comprises a non-transitory storage medium configured to store the one or more control words controlling the routing of the single bit from any lane of the first set of lanes to any lane of the second set of lanes.

5. The logic emulator of claim 4, wherein the switch further comprises a multiplexer matrix with corresponding selectors driven by selection bits from the one or more control words.

6. The logic emulator of claim 5, wherein the switch further comprises one or more input buffers configured to temporarily store data associated with an emulation job such that the stored data is provided to the multiplexer matrix in a time-aligned manner.

7. The logic emulator of claim 5, wherein the switch is further configured to provide data to the multiplexer matrix in a non-time-aligned manner such that data arriving earlier at the first set of lanes are provided to the multiplexer matrix earlier than data arriving later at the first set of lanes.

8. The logic emulator of claim 4, wherein the switch further comprises a sequencer configured to provide a stepping signal to the non-transitory storage medium to step through the one or more control words.

9. The logic emulator of claim 1, wherein a first subset of the first and second set of lanes is associated with a first emulation job and wherein a second subset of the first and second set of lanes is associated with a second emulation job.

10. The logic emulator of claim 1, wherein the switch further comprises an output buffer configured to temporarily store output data to control the throughput of the switch.

11. An emulation method comprising:
receiving, by a switch of a logic emulator, input data streams from a first set of lanes electrically connected to a first portion of an emulation application specific integrated circuit in the logic emulator; and
dynamically routing, by the switch according to one or more control words, a single bit from a data stream from any lane of the first set of lanes to any lane of a second set of lanes electrically connected to a second portion of the emulation application specific integrated circuit to allow the single bit to be transmitted from the first portion to the second portion.

12. The emulation method of claim 11, further comprising:
extracting, by the switch, the single bit from the input data stream from the any lane of the first set of lanes.

13. The emulation method of claim 12, further comprising:
appending, by the switch, the single bit to an outgoing data stream to the any lane of the second set of lanes.

14. The emulation method of claim 11, further comprising:
   storing, by the switch to a non-transitory storage medium, the one or more control words controlling the routing of the single bit from any lane of the first set of lanes to any lane of the second set of lanes.

15. The emulation method of claim 14, wherein the switch further comprises a multiplexer matrix with corresponding selectors driven by selection bits from the one or more control words.

16. The emulation method of claim 15, further comprising:
   temporarily storing, by the switch in or more input buffers, data associated with an emulation job such that the stored data is provided to the multiplexer matrix in a time-aligned manner.

17. The emulation method of claim 15, further comprising:
   providing, by the switch, data to the multiplexer matrix in a non-time-aligned manner such that data arriving earlier at the first set of lanes are provided to the multiplexer matrix earlier than data arriving later at the first set of lanes.

18. The emulation method of claim 14, further comprising:
   providing, by a sequencer of the switch, a stepping signal to the non-transitory storage medium to step through the one or more control words.

19. The emulation method of claim 11, wherein a first subset of the first and second set of lanes is associated with a first emulation job and wherein a second subset of the first and second set of lanes is associated with a second emulation job.

20. The emulation method of claim 11, further comprising:
   temporarily storing, by an output buffer of the switch, output data to control the throughput of the switch.

\* \* \* \* \*